July 11, 1950

C. W. CLAPP
2,514,935
VARIABLE IMPEDANCE APPARATUS
Filed Aug. 12, 1949

Inventor:
Charles W. Clapp,
by Paul A. Frank
His Attorney.

Patented July 11, 1950

2,514,935

UNITED STATES PATENT OFFICE 2,514,935

VARIABLE IMPEDANCE APPARATUS

Charles W. Clapp, Scotia, N. Y., assignor to General Electric Company, a corporation of New York Application August 12, 1949, Serial No. 110,005

4 Claims. (Cl. 323—86)

My invention relates to a variable impedance apparatus and has particular reference to an apparatus for varying the impedance in an alternating current circuit.

Various methods have been employed for varying the impedance of a circuit element in order to regulate the voltage or current of a circuit load. While variable impedance devices employing moving parts, such as rheostats and variable transformers, have been satisfactorily employed in many applications, they are limited in their speed of response to desired impedance changes. In other types of apparatus having no moving parts, such as saturable reactors, an instant response to control voltage changes is obtained, but the wave form of the circuit current is distorted. Where the operation of the circuit load is responsive to the wave shape of the alternating current supply, it is particularly important that the variable impedance operate with minimum distortion of the alternating current wave form.

It is an object of my invention to provide an improved electronically controlled variable impedance capable of instantaneous response to control signals and having an extended range of operation.

It is a further object of my invention to provide an improved electronically controlled variable impedance capable of regulating the alternating current of the load circuit with a minimum distortion of the current wave form.

A feature of my invention is the use of a controlled electron discharge device load in the secondary circuit of a transformer in order to change the effective impedance of the transformer primary winding, which is part of the alternating current circuit to be regulated. The voltage induced in the transformer secondary is utilized, by means of a voltage divider, to supply a control voltage for the discharge device load of essentially the same phase and wave form as the primary voltage. A second discharge device is employed in the voltage divider to regulate the control voltage amplitude in response to a direct current signal voltage applied to its control electrode.

The features which I desire to protect herein are pointed out with particularity in the appended claims. The invention itself, together with further objects and advantages thereof, may best be understood by reference to the following description taken in connection with the drawings in which Fig. 1 is a schematic diagram of an embodiment of my invention as employed in a circuit having a half-wave load and Fig. 2 is a schematic diagram of a modification of my invention as employed in a circuit having a full-wave load.

Figure 1:
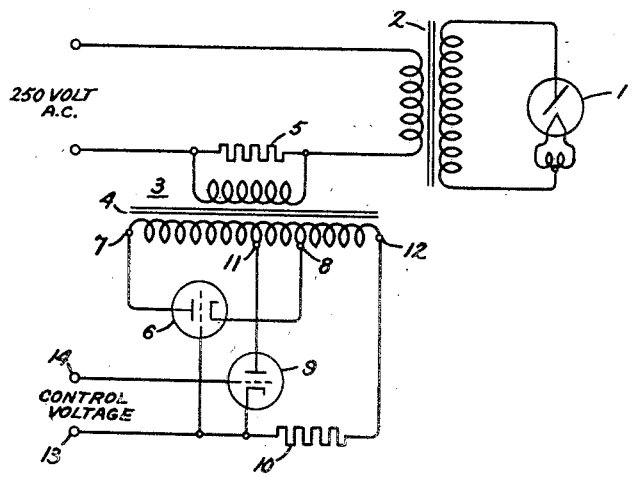
Figure 2:
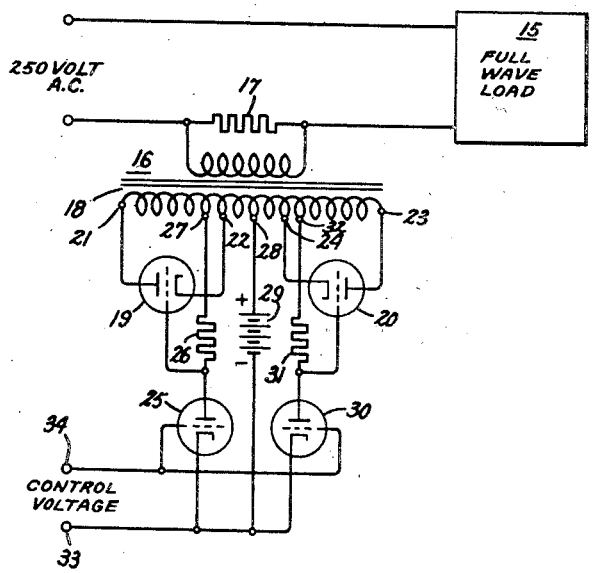

Referring now to Fig. 1, I have shown an X-ray tube 1 as an alternating current load whose voltage is regulated. For simplicity of explanation, I have shown a half-wave load instead of a full-wave load. An X-ray tube is a particularly appropriate example of the type of load to be regulated as its output is particularly sensitive to the wave form of the supply voltage, notably the voltage peaks.

The load 1 is connected to the secondary winding of a high voltage step-up transformer 2 which is in turn connected to a source of alternating current, which may suitably comprise a well-regulated 250 volt, 60 cycles per second source. A variable impedance 3 embodying my invention is connected in series with one of the current leads in the primary circuit to vary the voltage drop across this portion of the circuit and thus regulate the voltage across the load 1. In variable impedance 3 the impedance looking into the primary winding of an impedance matching step-up transformer 4 is controlled over an appreciable range by varying the load impedance in its secondary circuit. A resistor 5 is preferably shunted across the primary winding of the transformer 4 for reasons to be explained in a following paragraph.

The basic control element of the variable impedance is an electron discharge device 6 which may suitably be of the high vacuum thermionic type in which the effective anode-to-cathode resistance is determined by means of a control electrode or grid. The device anode is connected to an end tap 7 of the secondary winding of the transformer 4, and the cathode is connected to an intermediate tap 8 on the winding to shunt the discharge device across a major portion of the secondary winding.

During the alternate half-cycles when the half-wave load 1 is conducting, a voltage is induced in the secondary winding of the transformer 4 which gives the anode of the discharge device a positive potential with respect to its cathode. The anode voltage rises from zero to a positive peak and falls again to zero during each positive half-cycle, tending to cause a corresponding current flow through the discharge device. No current flows, of course, during the remaining half-cycles when the induced voltage at the anode tap 7 of the secondary winding is negative with respect to that of the cathode tap 8. Since a change in the current flow through the discharge device 6 is, in effect, a change of the impedance of the secondary circuit of the transformer 4, the control electrode or grid of the discharge device 6 may function to control the circuit impedance. While a direct current bias voltage applied to the control electrode could be made more or less negative to vary the average current to the discharge device 6, it would be less effective during the peak of the positive half-wave voltages appearing at the anode and hence less desirable for regulation of a load such as the X-ray tube 1 whose output is most sensitive to the peak value of the voltage across it. Therefore, an alternating voltage 180 degrees out of phase with the voltage appearing across the anode and cathode of the discharge device is particularly suitable, the voltage falling from the zero volts, full-wave average value to a negative peak value and rising again to zero during each operating half-cycle of the discharge device. With such a control voltage the control electrode is at its most negative potential with respect to the cathode at the same time the anode is at its most positive potential. By decreasing the amplitude of the alternating control voltage so that its peak value is less negative, a corresponding smaller voltage appears across the discharge device during the voltage peaks which is reflected into the primary circuit of the impedance 3. The impedance of the secondary circuit is thus controlled from a very low value up to the value representing the impedance of the secondary winding alone by the value of the potential wave applied between the control electrode and cathode of the discharge device 6.

To provide an alternating current control voltage for the control electrode of the discharge device 6, a potential divider comprising an auxiliary electron discharge device 9 and a resistor 10 are connected in series across a portion of the secondary winding of the transformer 4. The correct polarity is maintained by connecting the anode of the auxiliary discharge device 9 to a tap 11 on the transformer secondary, preferably intermediate taps 7 and 8, with an end terminal of the resistor 10 connected to the other end tap 12 of the winding. With the control electrode of the first electron discharge device 6 connected to the common connection of the cathode of the auxiliary discharge device 9 and the other end of the resistor 10, a control voltage for the discharge device 6 is provided which has essentially the same wave form as the voltage across the discharge device but is 180 degrees out of phase with it. By applying an appropriate control voltage between terminals 13 and 14 connected respectively to the cathode and control electrode or grid of the second auxiliary discharge device 9, the ratio of the voltages across the discharge device 9 and the resistor 10 of the voltage divider is readily controlled and the impedance of the discharge device 6 is accordingly determined. The tap 11 is not necessarily placed between taps 7 and 8, but it is desirable to include a portion of the secondary winding between taps 7 and 8 in the voltage divider source in order to offset the voltage drop across the voltage divider discharge device 9 when the most positive control voltage (zero volts) is desired.

To insure stable operation, the taps on the secondary winding of the transformer 4 are chosen so that the ratio of the voltage between taps 7 and 8 to the voltage between the taps 8 and 12 is greater than the amplification constant of the discharge device 6, since otherwise the circuit might oscillate whenever the anode-to-cathode resistance of discharge device 9 is sufficiently high. However, by making the above mentioned voltage ratio approach the amplification constant, the resulting regenerative effect results in considerable gain in control sensitivity.

In operation of my variable impedance 3, it may be seen that during the positive half-cycle of voltage across discharge device 6, a relatively small increase in the control voltage may be employed to decrease the magnitude of the alternating current voltage drop across the auxiliary discharge device 9, and hence increase the amplitude of the alternating voltage appearing across the resistor 10 comprising the remainder of the voltage divider. The instantaneous potential at the control electrode of the discharge device 6 thereby becomes less negative with respect to its cathode during that half-cycle, with a resulting increase in current through the device 6, which is equivalent to a decrease in impedance.

The discharge devices 6 and 9 are arranged so as to fail safely; that is, in case either of the devices is not operative, such as may be due to an unheated cathode during starting periods, the discharge device assumes a high impedance which is reflected into the primary circuit, thus protecting the primary circuit load from excessively high voltages. The resistor 5 shunted across the primary winding of the transformer 4 serves to limit the voltage appearing across the discharge devices to a safe value during such periods and also during the negative half-cycles when the variable impedance is employed for half-wave operation. In addition, it also increases the regulating range of the variable impedance as explained below.

To ensure safe and efficient operation of the discharge device 6 under the varying current and voltage conditions of the load 2, it is necessary to select operating conditions for the discharge device which approach but do not at any time exceed its maximum current, voltage, or power dissipation ratings. For this purpose, it is an advantage to be able to select not only the turns ratio of the impedance matching transformer 4 but also the impedance of the circuit connected to its primary winding. The resistor 5 can be used to make this latter adjustment.

For example, during its conductive half-cycles, the X-ray tube 1 shown in Fig. 1 draws an essentially constant current in the primary circuit. With such a load, the impedance connected to the primary of transformer 4 would, in the absence of resistor 5, be essentially infinite. By the addition of the shunt resistor 5, the primary load impedance can be reduced to any required value. The values of the resistor 5 and the turns ratio of the impedance-changing transformer 4 are accordingly selected by reference to the operating characteristics of the particular type of discharge device 6 employed.

Although not frequently encountered, it is possible that, for some particular load device 1, the variable impedance 3 may be installed in a circuit having an impedance too low to permit most efficient operation of discharge device 6 at the currents or voltages demanded by the load. In such a case the resistor 5 should obviously be connected in series with the primary of transformer 4 rather than in shunt with it as shown in Fig. 1.

It is obvious that without departing from the spirit of my invention, a second and oppositely connected high voltage winding on the transformer 4, together with a second secondary circuit, may be employed for controlling full-wave loads.

In Fig. 2, I have shown a modification of my invention especially useful when employed for full-wave operation. As shown in the figure, a full-wave load 15 is connected to a suitably regulated 250 volt, 60 cycles per second alternating current source with a variable impedance 16 connected in series with one of the leads. The variable impedance 16 has a fixed resistor 17 connected in parallel with the primary winding of a step-up impedance matching transformer 18 to operate in the same manner as in the embodiment of my invention previously described.

To control the load impedance of the secondary circuit of transformer 18, a pair of electron discharge devices 19 and 20 are employed so that each loads a portion of the secondary winding on alternate half-cycles of the load voltage. The discharge devices may suitably be of the high vacuum thermionic type whose effective anode-to-cathode impedances are determined by means of their respective control electrodes or grids. The anode of discharge device 19 is connected to one of the end taps 21 of the secondary winding of transformer 18 and the cathode is connected to tap 22 intermediate end tap 21 and the electrical center of the winding at tap 28. Similarly the anode of discharge device 20 is connected to the other end tap 23 of the transformer winding and the cathode is connected to tap 24 intermediate the center tap 28 and end tap 23.

Alternating control voltages for discharge devices 19 and 20 are provided by a pair of voltage dividers, each connected across a portion of the secondary winding of the transformer 18. The control electrode of discharge device 19 is connected to the junction of the anode of an auxiliary electron discharge device 25 and one terminal of a series resistor 26, the auxiliary device and the resistor comprising one of the voltage dividers. The divider is energized by connecting the other end of the resistor 26 to a tap 27 intermediate the end tap 20 and the tap 21 for the anode and cathode respectively of discharge device 19 and by connecting the cathode of the auxiliary discharge device 25 to the center tap 28 of the transformer secondary, preferably through a unidirectional voltage source 29, such as a battery. The voltage source 29 is connected in the circuit to provide a positive voltage on the anode of the auxiliary discharge device 25 so that the voltage across the divider resistor 26 drives the control electrode of discharge device 19 more negative during the conducting half-cycles of the discharge device 19 as the anode current of the auxiliary device 25 is increased.

Similarly an alternating control voltage source for discharge device 20 is provided by a second auxiliary discharge device 30 connected in series with a second divider resistor 31, the auxiliary discharge device cathode being connected to the center tap 28 of the winding through the voltage source 29 and the other end of the resistor being connected to tap 32 between taps 23 and 24. The control electrode of the discharge device 20 is connected to the common junction of the auxiliary device 30 and the resistor 31 to provide a control voltage operating similarly as for discharge device 19. In this embodiment of my invention the discharge device and resistor are transposed in relation to the voltage divider arrangement shown in Fig. 1 to simplify the circuit arrangement for full-wave operation. Addition of the voltage source 29 is also simplified thereby.

To facilitate application of a control voltage, the cathodes of the auxiliary discharge devices 25 and 30 are connected to a terminal 33 and the control electrodes to a terminal 34 so that an appropriate control voltage applied between the terminals 33 and 34 controls the variable impedance for full-wave regulation of the variable impedance 16. It is obvious that by omission of elements 20, 30, 31 this circuit could also be used to control a half-wave load such as that depicted in Fig. 1.

While there have been shown and described particular embodiments of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as new and desire to secure by Letters Patent of the United States is:

1. In combination, a circuit having in series connection a load, a source of alternating current and a primary winding of a transformer, and means for adjusting the impedance presented by said primary winding comprising a secondary winding of said transformer inductively coupled to said primary winding, an electron discharge device connected across a portion of said secondary winding, a voltage divider comprising a resistor and an auxiliary electron discharge device connected in series across another portion of said secondary winding, said first discharge device having a control electrode connected to the common connection of said auxiliary discharge device and said resistor, and a control voltage connected to the control electrode of said auxiliary discharge device to regulate the impedance connected to said secondary winding.

2. In combination, a circuit having in series connection a load, a source of alternating current and a primary winding of a transformer, a resistor connected across said primary winding, and means for adjusting the impedance presented by said primary winding comprising a secondary winding of said transformer inductively coupled to said primary winding, an electron discharge device connected across a portion of said secondary winding, a voltage divider comprising a resistor and an auxiliary electron discharge device connected in series across another portion of said secondary winding, said first discharge device having a control electrode connected to the common connection of said auxiliary discharge device and said resistor, and a control voltage connected to the control electrode of said auxiliary discharge device to regulate the impedance connected to said secondary winding.

3. A variable impedance adapted to be connected in series with an alternating current load comprising the primary winding of a transformer and a resistor connected in parallel, and control means connected to the secondary winding of said transformer for varying its impedance, said control means comprising a pair of electron discharge devices each having an anode, a cathode, and a control electrode for varying the effective anode-to-cathode resistance, the first of said discharge devices being connected across a substantial portion of said secondary winding, the second of said discharge devices being connected in series with a resistor as a voltage divider across another portion of said winding, said control electrode of said first discharge device being connected to the common terminal of said second discharge device and said resistor, and means for connecting a control voltage source between said control electrode and said cathode of said second discharge device.

4. In a circuit having a load and a source of alternating current connected to said load, an impedance connected in series with said load for regulating the load voltage amplitude, said impedance comprising the primary winding of a transformer and a resistor connected in parallel, and means for adjusting the magnitude of said impedance comprising an electron discharge device having an anode connected to an end tap of the secondary winding of said transformer and having a cathode connected to an intermediate tap of said winding, said discharge device having a control electrode for varying its effective anode-to-cathode resistance, a voltage divider comprising a second electron discharge device and a resistor connected in series, said control electrode being connected to the junction of the cathode of said second discharge device and said resistor, the other end of said resistor being connected to the other end of said winding and the anode of said second discharge device being connected to a tap intermediate said anode and cathode taps of said first discharge device, said second discharge device having a control electrode for varying its effective anode-to-cathode resistance, and a control voltage source connected between said control electrode and said cathode of said second discharge device.

CHARLES W. CLAPP.

No references cited.